United States Patent Office 3,329,745
Patented July 4, 1967

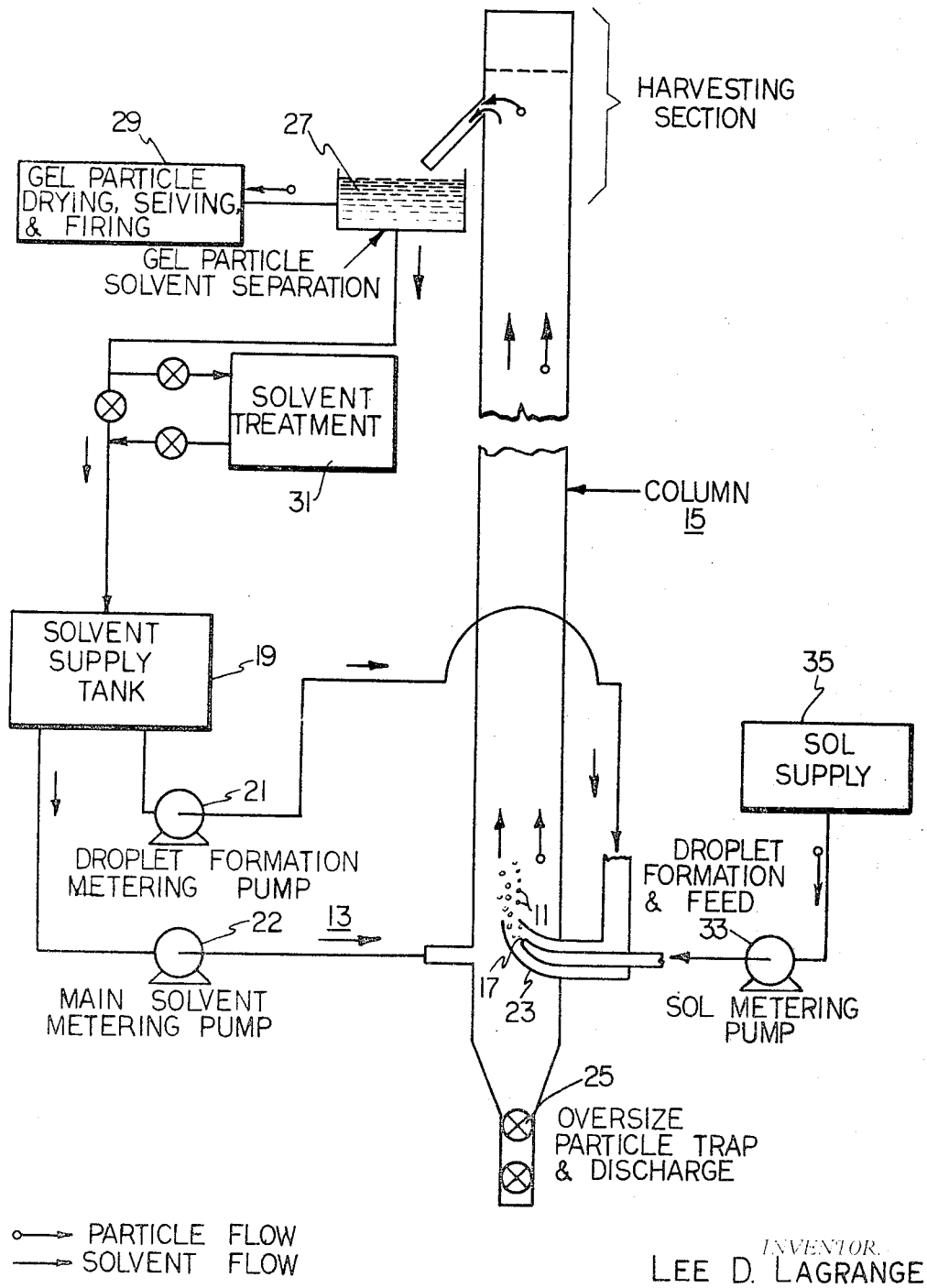

3,329,745
PROCESS FOR MAKING GELLED SPHERICAL PARTICLES OF OXIDES
Lee D. La Grange, San Diego, Calif., assignor, by mesne assignments, to the United States of America as represented by the United States Atomic Energy Commission
Filed Oct. 5, 1965, Ser. No. 493,277
2 Claims. (Cl. 264—.5)

ABSTRACT OF THE DISCLOSURE

This invention is a process for preparing small spheres from droplets of a colloidal oxide sol by injecting the droplets into an upwardly flowing stream of an alcohol.

---

The present invention relates generally to a process for producing spherical particles and more particularly relates to a process for producing spherical particles of nuclear fuel materials and to the apparatus adapted for such production.

In certain nuclear reactors, the nuclear fuel is utilized in particulate form. There are advantages to employing the fuel particles in spherical form. Spherical particles provide desirable heat transfer characteristics. If it is considered desirable to coat the particles for fission product retention, a uniform coating may be more readily applied to spherical particles than to particles of other shapes. As used hereinafter in this application, the term "spherical" is intended to apply in its broadest sense to particles whose cross sectional shape approximates a circle so that the term embraces particles which are spheroidal.

It is known to produce spherical particles from sols of the desired material by ejecting the sol through a nozzle into an organic fluid. The sol droplets that are formed interact with the fluid to form gelled particles. This process is a batchwise operation having inherent limitations including the quantity of the gelled particles, which may be produced before the organic fluid must be replaced. The process is further undesirable because the conditions for making the particles must be very closely controlled within narrow ranges.

It is also known to produce spherical particles in a continuous process in which a sol is injected as droplets, into the top of a tapering column which narrows toward the bottom wherein a stream of organic fluid flows upward in countercurrent flow to the descending sol droplets. Gelled particles are formed by the reaction of the organic fluid with the sol droplets as the droplets descend through the column. Since the upward velocity of the organic fluid decreases with the increasing diameter of the taper, droplets will cease to fall through the fluid in a region where their terminal velocity of fall matches the net upward velocity of the fluid and will only continue downward as they become more dense by gellation. In the ideal case, fully gelled particles should drop out the column bottom into a trap ready for harvest. In the real case, because of the flow patterns within the column and the range of droplet sizes formed, it is very difficult to design, build and operate such a device.

Accordingly, it is an object of the present invention to provide an improved process for preparing spherical particles. It is another object of this invention to provide an improved process for continuously preparing spherical particles from a suitable sol which process is economical and easy to control and apparatus for performing that process.

These and other objects of the invention are more particularly set forth in the following detailed description and in the accompanying drawing of a diagrammatic view of the apparatus and a process embodying various features of this invention.

In general, the invention relates to an improved continuous process and improved apparatus for producing spherical particles of nuclear fuel materials from droplets of a colloidal solution or sol of suitable starting material through the formation of gel particles. As used hereinafter, the term "sol" refers to a system which possesses the shape of its container and includes two-phase colloidal systems consisting of a solid and a liquid, whereas the term "gel" refers to a two-phase colloidal system consisting of a solid and a liquid which behaves as an elastic solid and retains its characteristic shape. More particularly, an improved method for producing small spheres of nuclear fuel material of a desired particle size through a dehydration gelling technique is provided.

In the process illustrated in the drawing, sol droplets 11 are injected continuously into the bottom of an upward flowing stream of organic fluid 13 in a column 15 and by interaction with that fluid while being carried upward, form gel particles which are continuously discharged for further processing. The organic fluid flow rate is adjusted so that the upward velocity of the fluid is slightly greater than the terminal velocity of fall in the fluid of the largest desired size particle at its maximum density. Oversize particles which may be caused by agglomaration or coalescing, fall counter to the organic fluid stream and may be removed through a bottom trap or the like.

The particular sol which is used depends upon the ultimate composition of the spheres that is desired. Various sols are known to the art which are useful for producing particles in this general manner. The sol may be formed by any conventional sol forming technique. In one embodiment of the invention, a thorium oxide sol may be formed by heat decomposition of thorium nitrate to the oxide and subsequent dispersion of the oxide in water using a high shear mixer, such as a Cowls Dissolver.

The useful concentration of a sol to be utilized is dependent upon its resulting viscosity and droplet forming characteristics. In one embodiment of the invention for the production of spherical particles of thorium oxide, it is preferred that the concentration of the oxide in the sol be from about 2.0 molar to about 4.0 molar.

The sol droplets may be formed and injected into the organic fluid by any suitable method. The preferred method of droplet generation is to discharge the sol through an orifice 17 into a small tube of swiftly flowing organic fluid which surrounds the sol immediately after discharge from the orifice. The organic fluid bearing the droplets is, in turn, discharged upwardly into the bottom of the column wherein the main organic fluid stream is flowing upward. As can be seen in the drawing, both organic fluid streams may be taken from the same supply tank 19, but are metered by separate fluid metering pumps 21 and 22. This permits precise control over both the droplet formation organic fluid stream and the main column organic fluid stream. Although there is no absolute limit to the maximum size of the sol droplets, it is believed that the upper practical limit is about 2000 microns, above which limit it is difficult to maintain sphericity.

The droplet size and droplet size distribution may be controlled by varying the size of the sol orifice 17, the organic fluid tube diameter 23, the density and viscosity (concentration) of the sol, the position and attitude the sol orifice in the surrounding organic fluid tube and the interfacial tension between the sol and the organic fluid through proper selection of the particular organic fluid. When particles are produced from thorium oxide sols, a suitable organic fluid is employed which is substantially immiscible with the sol, so that the sol remains in droplet form in the upwardly flowing stream with surface tension maintaining the droplets in spherical form, and which does not undesirably react with the sol. Preferably, the organic fluid should not be more than about one percent soluble in the sol. When this type of sol is used, the gel particles may be formed through a dehydration gelling process using an organic fluid which has an adequate solubility for water. Preferably, an alcohol in which water is about three percent soluble is used. The preferred organic fluid is 2-ethyl-1-hexanol. However, it should be understood that the general process and apparatus may be used for any of several sol-fluid interactions.

The illustrated column 15 contains an upwardly flowing stream of organic fluid which carries the sol droplets upward in co-current flow with the organic fluid. Proper operation of the column requires that the organic fluid velocity be sufficient to carry upward the largest size particle desired and that the column be long enough to allow any particles a residence time sufficient to complete the sol/fluid interaction. By using co-current flow of the sol droplets and the organic stream, the residence time in the column for individual particles is made to increase with increasing particle size. Thus, the largest particles, which require the longest gel time to fully gel, are retained in the column for the longest period. This is in contradistinction to a cylindrical column where the sol droplets are in countercurrent flow to the organic fluid wherein the residence time is inversely proportional to particle size and the largest diameter particles have the shortest residence time. Thus to attain the required residence time for a given particle size, a counter-current column must be much taller than the illustrated co-current column 15.

An additional advantage of the use of the illustrated co-current column 15 of this invention is that oversize particles which are produced through particle agglomeration are not carried upward with the main organic fluid stream, but instead, fall counter to the stream and may be harvested from the bottom of the column for reprocessing through the trap 25. In contrast, when countercurrent flow is used, oversize particles are carried along with the main body of particles and must be subsequently removed through screening. Consequently, much effort has been expended in designing countercurrent columns to limit the number of oversize particles formed through agglomeration. For the co-current column of this invention, particle agglomeration or buildup on the walls of the column is relatively immaterial, and a simple cylindrical column shape may be used.

In the specific embodiment of producing thorium oxide spheres, as previously stated, the sol/fluid interaction mechanism consists of dehydration gelling. As the sol droplets are carried upward through the column by the co-current stream of 2-ethyl-1-hexanol, the droplets are dehydrated through the absorption of water from the droplet by the alcohol. The resultant gel particles are carried over the top of the column and into suitable means for separating the particles from the alcohol.

The residence time required to dry a thorium oxide sol droplet to a gel particles, and the resulting column height, is primarily dependent on particle size and sol concentration. In general, the residence time and the required column height increases with increasing particle size and decreasing sol concentration. For example, for a system using 2-ethyl-1-hexanol at 55° C., if thorium hydroxide particles up to 500 microns in diameter are produced from a 2 molar sol, a column of 27 meters is required. If the sol concentration is increased to 4 molar, the column height may be reduced to 14 meters. Similarly, if the maximum particle size required is reduced to 420 microns, the column height required using a 2 molar sol concentration is reduced to 18 meters, while the height required for a 4 molar concentration is reduced to 9 meters.

In addition, it has been discovered that the residence time required to produce a given particle size may be reduced by a factor of up to 10, when compared to operation room (about 20° C.), if the main stream of drying alcohol is heated to a temperature of between about 50° C. and about 60° C., preferably about 55° C. While higher alcohol temperatures may be used to shorten the residence time, higher temperatures above this range have a tendency to distort the particle shape and produce egg-shaped particles rather than spheres. The alcohol may be heated prior to introduction to the bottom of the column by immersion heaters or the like, or, if the column is constructed of heat-conducting material, the alcohol may be heated directly in the column. A heated column wall has the further advantage of preventing particle adherence to the wall.

The column height required for a single column may, if desired, be reduced by using a two column system. In such an embodiment, partly-reacted droplets from the top of the first column are discharged to the top of a second column in which they are allowed to sink counter to a slowly rising stream of organic fluid. During their descent in the second column, the reaction between the droplets and the organic fluid is completed and the particles are harvested from the bottom of the second column. Of course, to take advantage of the very desirable features of the co-current flow process, the first column should be long enough so that the droplets have stabilized into a semi-solid condition. The two-column approach may also be used to conveniently remove undersized particles. For this purpose, the flow rate of the organic fluid in the second column is adjusted so that particles of a desired size are permitted to settle while undersized particles are carried upward with the organic fluid. Such a two-column system permits complete control over the range of particle sizes through removal of oversized particles in the first column and the removal of undersized particles in the second column.

Any suitable particle-harvesting system 27 may be used with the illustrated single column overflow system. It may be simple in concept, such as a mesh screen of the proper size opening, or may be more elaborate and incorporate means for automatic conveyance to drying and calcining equipment 29. Particle drying should be carefully controlled to avoid split particles from an organic fluid-salt reaction.

After its separation from the gelled particles, the organic fluid is treated to remove any contaminants and is then recycled to the column. In the case of dehydration gelling, treatment includes the removal of absorbed water and nitrates and may be carried out in any suitable manner, such as by contacting the alcohol with calcium oxide in a continuous system 31.

The following example further illustrates a process and apparatus for producing spheres embodying various of the features of the invention. It should be understood that this example is intended to in no way limit the scope of the invention which is defined in the appended claims.

EXAMPLE I

A column 15 is constructed for producing small spheres of thorium oxide by dehydration gelling with alcohol. The column 15 consists of a 1-inch inside diameter tube having a height of about nine meters, as measured between the top of a droplet generator located at the bottom of the column and an overflow outlet located at the top of the column. The column extends one foot above the overflow outlet to provide for alcohol buildup above the overflow. The overflow outlet consists of a 1-inch inside diameter tube joined to the column so as to form a downwardly steeply pitched Y member. The angle between the overflow tube and the column is acute so as to provide as little horizontal contact between gelled particles and the overflow tube as possible.

The droplet generator includes a 2 mm. inside diameter tube which terminates in a 0.5 mm. diameter orifice 17. This tube is connected to a metering pump 33 which is supplied from a sol holding tank 35. The sol orifice tube is positioned inside a second tube 23, of 5 mm. inside diameter, through a flexible seal which permits the attitude of the orifice 17 to be adjusted within the outer tube 23. The outer tube 23 is connected to a metering pump 21 which is supplied from a 2-ethyl-1-hexanol holding tank 19, as illustrated in the drawing.

The droplet generator assembly is located in the bottom of the column in such a manner that the outer alcohol supply tube 23 of the droplet generator extends outwardly and upwardly from the orifice of the sol supply tube for a distance of 2 inches.

A 4 molar sol is prepared from thorium oxide obtained by decomposing thorium nitrate at a temperature of 450° C. The sol is prepared by adding the thorium oxide to water while it is vigorously agitated.

The thorium oxide sol is metered to the sol orifice tube at a rate of 22 grams of thorium oxide per minute. 2-ethyl-1-hexanol is supplied to the outer tube of the droplet generator at a rate of 1.65 liters per minute, resulting in an alcohol velocity at the point of discharge into the column of about 140 cm. per second.

2-ethyl-1-hexanol, which has been heated to a temperature of 55° C., is supplied to the bottom of the column at a rate of 7 liters per minute, resulting in an alcohol velocity of 22.6 cm. per second in the 1-inch column. This velocity is equivalent to the Stokes velocity in alcohol of a 500 micron diameter particle with a density of 5 grams per cm.$^3$, the maximum size of the gelled particles it is desired to produce.

The upwardly flowing alcohol containing the dehydration-gelled particles overflows through the outlet at the top of the column onto a Tyler 325 mesh stainless steel screen 27 which will retain particles about 40 microns and above. The column is operated for a period of 1 hour after equilibrium has been obtained, and the product is collected for this time period. A total of 1200 grams of thorium oxide spherical particles between about 40 and 500 microns in size are obtained. This constitutes about 91 percent of the total thorium oxide in the sol injected into the column. The balance of the thorium oxide is either recovered as oversize particles at the bottom of the column or is recovered as undersize particles from the recycle alcohol stream.

After separation from the thorium oxide particles, the alcohol is dried by contacting it with calcium oxide in a bypass loop 31. The dry alcohol is returned to the alcohol supply tank 19 for subsequent recycle.

The gelled particles retained on the screen are dried thoroughly by heating them for 16 hours in a hot-air circulating oven at about 80° C. and are then fired for 1 hour at about 1150° C. The fired particles are acceptably spherical in shape, have a density between about 9.5 gm./cc. and about 10 gm./cc., and range in size primarily from about 100 microns to about 350 microns. They are considered entirely satisfactory for use as a fertile material in nuclear reactors.

Various of the features of the invention are set forth in the following claims.

What is claimed is:

1. In a process for preparing small spheres, the improvement which comprises injectiong droplets of a colloidal oxide sol into an upwardly flowing stream of an alcohol that is substantially immiscible with said sol whereby surface tension maintains said droplets in spherical form, and maintaining the velocity of said stream of alcohol sufficient to suspend and carry sol droplets of not greater than a predetermined particle size upward in co-current flow with said alcohol stream, said alcohol removing the water from said sol during said co-current travel to change said sol droplets into gelled spherical particles.

2. In a process for preparing small thorium oxides spheres, the improvement which comprises injecting droplets of a colloidal sol of thorium oxide in water into an upwardly flowing stream of 2-ethyl-1-hexanol whereby surface tension maintains said droplets in spherical form, heating said alcohol to maintain the temperature of said upward flowing stream at about 55° C., and maintaining the velocity of said alcohol stream sufficient to suspend and carry sol droplets of not greater than about 2000 microns in size upward in co-current flow with said alcohol stream, said alcohol removing the water from said sol during said co-current travel and thereby changing said sol droplets into gelled spherical particles.

References Cited

UNITED STATES PATENTS

| | | | |
|---|---|---|---|
| 2,342,661 | 2/1944 | Gunnell | 264—4 |
| 2,495,147 | 1/1950 | Street | 18—2.4 |
| 2,566,567 | 9/1951 | Hutchinson et al. | 18—2.4 |
| 2,875,473 | 3/1959 | Mitchell et al. | 264—14 |
| 3,290,122 | 12/1966 | Clinton et al. | 264—.5 |

L. DEWAYNE RUTLEDGE, *Primary Examiner.*